United States Patent Office 3,228,747
Patented Jan. 11, 1966

3,228,747
PREPARATION OF DIFLUOROAMINE
Kenneth O. Groves, Douglas A. Rausch, and Ralph A. Davis, Midland, Mich., assignors to The Dow Chemical Company, Midland, Mich., a corporation of Delaware
No Drawing. Filed Oct. 31, 1960, Ser. No. 66,343
5 Claims. (Cl. 23—14)

This invention relates to a process for the preparation of difluoroamine.

Difluoroamine is a colorless gas and is widely used in various syntheses to introduce the $NF_2$ group in organic molecules. While difluoroamine is a very desirable reactant, it is subject to detonation. This property greatly limits the utility of this material especially where shipping and transportation is necessary. A simple process whereby the difluoroamine could be prepared on the site where needed is greatly desirable.

It is therefore an object of this invention to provide a process for the preparation of difluoroamine. A further object is to provide a simple process which may be carried out with a minimum amount of equipment. A still further object is to provide a process wherein relatively stable reactants are used.

The above and other objects are attained according to the invention by the reaction of 1,1-difluorourea with a mineral acid, such as sulfuric, nitric, phosphoric, hydrochloric and other mineral acids. The process is simple and may be carried out at the location where the difluoroamine is needed. Difluorourea is relatively stable and may be shipped and handled with reasonable care without any danger of detonation or explosion.

Theoretically one mole of acid is required to react with every mole of difluorourea. However, the ratio of reactant used is not critical since some product will be obtained with any amount of the reactants. Generally, a slight excess of acid is used to insure that all of the more expensive difluorourea is reacted.

The reaction may be simply carried out by adding the difluorourea to the acid or adding the acid to the difluorourea. Generally, atmospheric pressure and room temperature is used for the reaction. The reaction proceeds rapidly at room temperature and no material advantage is gained by using a higher reaction temperature. The difluoroamine being gaseous at atmospheric pressure and room temperature is evolved from the reaction mixture along with carbon dioxide and may be conveniently recovered and separated from the carbon dioxide by condensation. Also if desirable, the difluoroamine may be absorbed in a solvent, such as a low molecular weight alkyl ether having alkyl radicals of 1 to 2 carbon atoms, and then stripped from the solvent. This also affords a method for removing most of the $CO_2$ from the product. To simplify the recovery of the difluoroamine or where the difluoroamine is desired at higher pressures, the reaction may be carried out above atmospheric pressure. When higher pressures are used a reaction temperature above room temperature and up to about 50° C. may be advantageously employed. However, since the difluoroamine is subject to detonation, it is generally preferred to carry out the reaction at room temperature and atmospheric pressure.

In addition to sulfuric acid, other mineral acids such as, for example, nitric, hydrochloric, hydrobromic and phosphoric may be used. Since the difluoroamine product obtained is evolved from the reaction mixture, an acid having a low volatility, such as sulfuric or phosphoric, is preferred. The concentration of the acid used is not critical. However, with a concentrated acid the reaction is less vigorous and thus most often employed.

To further illustrate the invention, 0.177 gram of difluorourea was placed in a U-tube reactor through which nitrogen gas was passed. The U-tube reactor was connected to a drying tube filled with magnesium perchlorate which in turn was connected to a gas absorption tube containing diethyl ether. The absorption tube was vented to the atmosphere and immersed in a Dry Ice-acetone bath which was at about −80° C. Concentrated sulfuric acid was added dropwise to the difluorourea. Upon the addition of the sulfuric acid, gaseous reaction products were immediately evolved. These products were passed through the drying tube and through the gas absorption tube containing diethyl ether at −80° C. Approximately a stoichiometric amount of sulfuric acid was thus added to the difluorourea. After the addition of the acid, the ether solution in the gas absorption tube was removed and allowed to warm to room temperature. Upon analysis it was found to contain 0.066 gram of difluoroamine. This represented a yield of about 68 percent.

In a manner similar to that above phosphoric, nitric, and hydrochloric acid may be used in place of the sulfuric acid.

What is claimed is:

1. A process for the preparation of difluoroamine, which comprises intermixing the 1,1-difluorourea with a mineral acid to react the difluorourea with the acid to produce difluoroamine, and separating the difluoroamine from the reaction mixture.

2. A process according to claim 1 wherein the mineral acid is sulfuric acid.

3. A process for the preparation of difluoroamine, which comprises intermixing 1,1-difluorourea with a mineral acid to react the difluorourea with the acid to form difluoroamine in a gaseous reaction product and cooling the gaseous reaction product to condense the difluoroamine from the gaseous reaction product.

4. A process for the preparation of difluoroamine, which comprises intermixing 1,1-difluorourea with a mineral acid at substantially room temperature and atmospheric pressure to thereby react the acid with the difluorourea to form a gaseous reaction product containing difluoroamine, passing the gaseous reaction product containing the difluoroamine into contact with a low molecular weight dialkyl ether to adsorb the difluoroamine, and recovering the difluoroamine from the ether.

5. A process according to claim 4 wherein the acid is sulfuric acid and the ether is diethyl ether.

No references cited.

MAURICE A. BRINDISI, Primary Examiner.

ROGER L. CAMPBELL, Examiner.